Oct. 11, 1927.
J. THOMPSON
1,645,208
ICE CREAM DISHER
Filed April 6, 1927
2 Sheets-Sheet 1
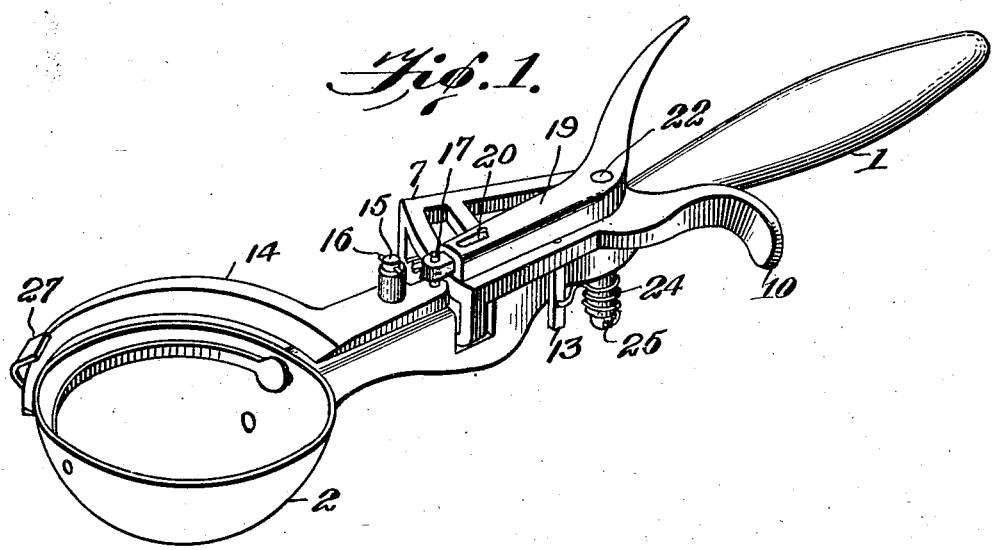
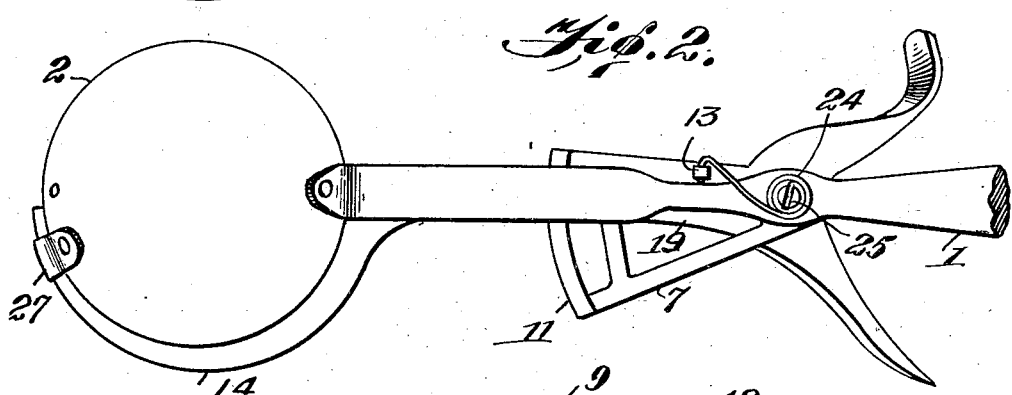
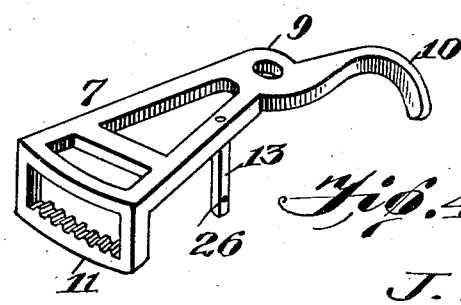
INVENTOR.
J. Thompson,
BY
ATTORNEYS.

Oct. 11, 1927.
J. THOMPSON
ICE CREAM DISHER
Filed April 6, 1927
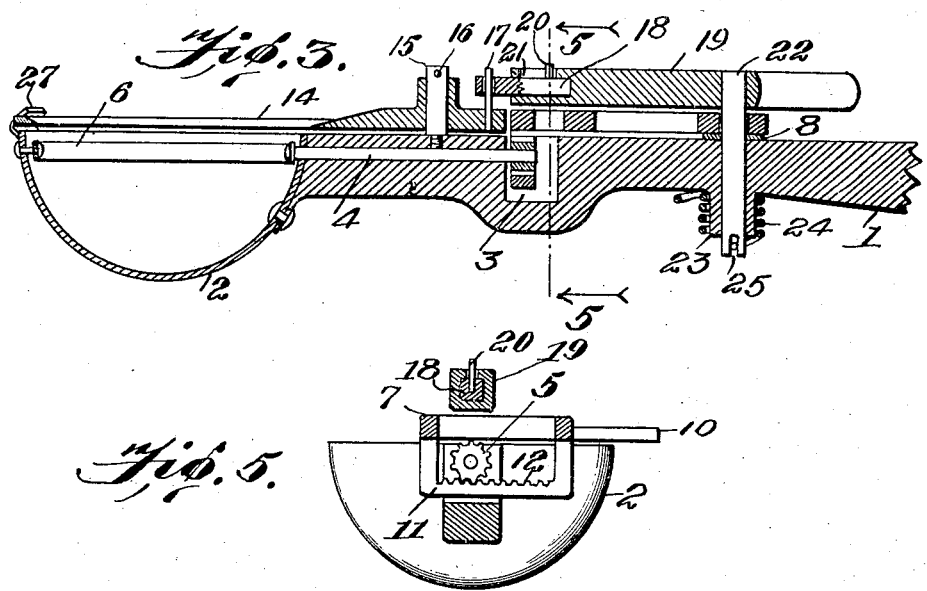
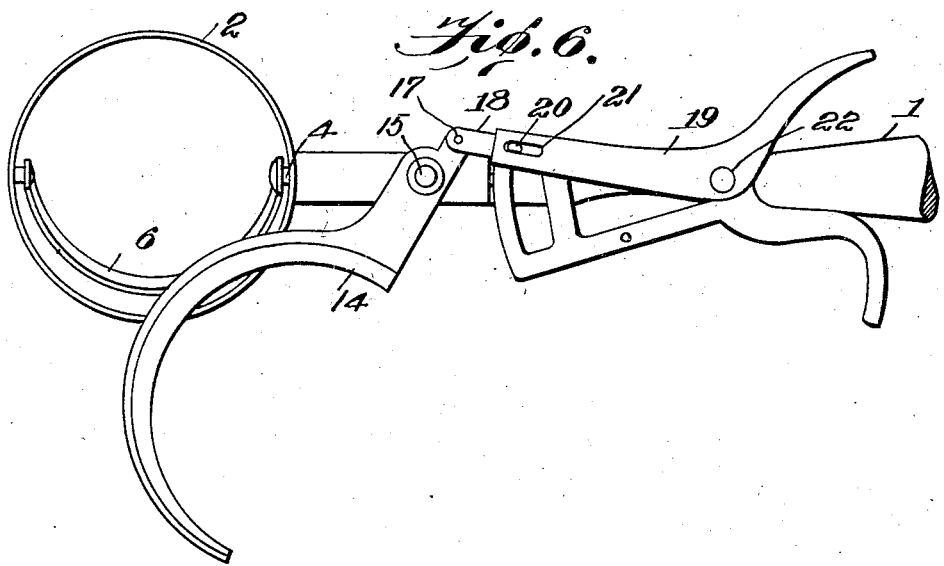
INVENTOR.
J. Thompson,
BY
ATTORNEYS.

Patented Oct. 11, 1927.

1,645,268

UNITED STATES PATENT OFFICE.

JINK THOMPSON, OF HUNTINGTON, WEST VIRGINIA.

ICE-CREAM DISHER.

Application filed April 6, 1927. Serial No. 181,473.

This invention relates to an ice cream disher.

The object of the invention is the construction of a simple and efficient ice cream disher, whereby ice cream can be dished, the extra amount of cream can be cut off the scoop, and then the ice cream can be readily released from the scoop.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a perspective view of an ice cream disher constructed in accordance with the present invention.

Figure 2 is a bottom plan view of the device.

Figure 3 is a longitudinal vertical sectional view of the device.

Figure 4 is a perspective view of the rack frame.

Figure 5 is a sectional view taken on line 5—5, Figure 3 and looking in the direction of the arrows.

Figure 6 is a top plan view of the device, showing the blade as it appears after it has cut the extra amount of ice cream off the scoop.

Referring to the drawings by numerals, 1 designates the handle, to the outer end of which is secured the scoop 2. In the handle 1 is formed a cut-out portion 3, and extending longitudinally of the handle is rocker shaft 4; on the inner end of rocker shaft 4 is fixedly secured pinion 5, this pinion being positioned in the cut-out portion 3. On the outer end of rocker shaft 4 is fastened the releasing scraper 6, this scraper being in scoop 2, and is adapted to have a swinging action within the scoop 2 when rotary movement is imparted to rocker shaft 4. A rack frame 7 (Fig. 4) is placed above the handle 1 with washer 8 (Fig. 3) interposed therebetween. This rack frame is provided with a hub 9, an integral grip 10 and a depending rectangular end 11. This depending end 11 is provided on its lower portion with upstanding teeth 12. This depending end 11 is positioned in the cut-out portion 3 with pinion 5 in said end 11 and meshing with teeth 12. A vertical stop finger 13 is fastened to the rack frame 7, and this finger engages the side of handle 1 for limiting the swinging movement of the rack frame in one direction upon the handle 1.

The swinging blade 14 is pivotally mounted upon vertical shaft 15, and by means of a pin 16, the blade is retained upon said shaft 15. A pin 17 is secured at its lower end to the inner end of the blade 14, and the upper end of pin 17 is loosely mounted in the outer end of bolt 18; this bolt 18 is slidably mounted in the outer end of knife lever 19. A pin 20 is secured at its lower end to sliding bolt 18 and its upper end is positioned in the elongated slot 21 formed in the outer end portion of knife lever 19. A vertical shaft 22 extends through knife lever 19, and said lever and shaft are fixedly secured together. Shaft 22 also extends through the apertured hub 9 (Figs. 3 and 4) of rack frame 7, washer 8, and handle 1. A depending boss 23 is formed upon the handle 1, through which said shaft 22 extends, and around this boss is a coil spring 24. One end of coil spring 24 is fastened in the bifurcated end 25 of shaft 22 (Fig. 3) and the other end of said spring is fastened in the aperture 26 (Fig. 4) of the depending stop finger 13. This spring 24 serves to normally keep said stop finger 13 against the sides of the handle, whereby the releasing scraper is held in its normal horizontal position as shown in Figures 1 and 3. At the same time, by reason of the other end of the spring being in bifurcated end 25 of shaft 22, the blade 14 is held to one side, against bracket 27, which bracket is fastened at its lower end to the outside top edge of scoop 2. Therefore, it will be seen that the single spring 24, and its peculiar fastening to the associated parts, serves to hold the scraper 6 and blade 14 in an inoperative position, ready to perform their respective functions upon the operator operating the rack frame and knife lever.

The shaft 22 not only serves to secure the knife lever and rack frame in an operative position upon the handle 1 but also serves as an efficient means for fastening the coil spring 24 to the knife lever in such manner as to cause the blade to be normally held in an inoperative position, ready for use. the will of the operator. Further, by means of the sliding bolt connection between the inner ends of the knife lever and the swinging blade, a very efficient cutting action is obtained, for cleaning away a surplus amount of ice cream that may be on the scoop 2.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such changes or alterations as shall fairly fall within the scope of the appended claims.

What I claim is:

1. In a device of the class described, the combination with a handle, provided at one end with a scoop, of a blade pivotally mounted on said handle and adapted to swing across the scoop, a knife lever movably mounted on said handle, means pivotally and slidably connecting said knife lever to said blade, and scraper means in said scoop.

2. In a device of the class described, the combination with a handle, provided with a scoop, of a blade pivotally mounted on said handle and adapted to swing across said scoop, a knife lever movably mounted on said handle, a sliding bolt secured upon said knife lever, means pivotally connecting said bolt and said blade, and a scraper in said scoop.

3. In a device of the class described, the combination with a handle, provided with a scoop, of a blade movably mounted above said scoop, a knife lever movably mounted on said handle, said knife lever provided with a sliding bolt and with an elongated slot, a pin fastened to said bolt and in said slot, a pin fastened at its inner end to said blade and loosely mounted in said bolt, and scraper means in said scoop.

4. In a device of the class described, the combination with a handle provided at one end with a scoop, a swinging blade on said handle and above said scoop, a knife lever on said handle, sliding means fastened to said knife lever and pivotally connected to said blade, and a scraper in said scoop.

5. In a device of the class described, the combination with a handle provided at one end with a scoop, of a scraper in said scoop, a rack frame on said handle, means connecting said rack frame to said scraper whereby when the rack frame is swung upon the handle, said scraper will be operated, said rack frame provided with a depending finger normally against said handle, a blade on said handle contiguous to said scoop, a knife lever provided with a shaft, means connecting said knife lever and blade, said shaft extending through said rack frame and handle, and a spring mounted on said handle and being connected at one end to said shaft and at its other end to said depending finger.

6. In a device of the class described, the combination with a handle provided with a scoop, of a rack frame against said handle, a knife lever against said rack frame, a shaft fixedly secured to said knife lever and loosely extending through said rack frame and handle, said rack frame provided with a depending finger, said shaft being bifurcated on its outer end, said handle provided with a boss, a coil spring on said boss with one end in the bifurcated end of the shaft and its other end in said depending finger, a movable blade on said handle, means connecting said blade and knife lever, a scraper within said scoop, and means connecting said scraper and said rack frame, whereby when the rack frame is operated, the scraper will be operated.

7. In a device of the class described, the combination with a handle provided with a scoop, a knife lever provided with a shaft fixedly secured thereto, said shaft extending through said handle, a rack frame journalled upon said shaft, a spring connected at one end to said shaft and at its other end to said rack frame, a blade on said handle, means connecting said blade and said knife lever, a scraper within said scoop, and means connecting said scraper and said rack frame.

JINK THOMPSON.